United States Patent
Achar et al.

(10) Patent No.: US 12,093,805 B2
(45) Date of Patent: Sep. 17, 2024

(54) OPTIMAL POLICY LEARNING AND RECOMMENDATION FOR DISTRIBUTION TASK USING DEEP REINFORCEMENT LEARNING MODEL

(71) Applicant: Tata Consultancy Services Limited, Mumbai (IN)

(72) Inventors: Avinash Achar, Chennai (IN); Easwara Subramanian, Hyderabad (IN); Sanjay Purushottam Bhat, Hyderabad (IN); Vignesh Lakshmanan Kangadharan Palaniradja, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 846 days.

(21) Appl. No.: 17/213,333

(22) Filed: Mar. 26, 2021

(65) Prior Publication Data
US 2022/0083842 A1 Mar. 17, 2022

(30) Foreign Application Priority Data
Aug. 28, 2020 (IN) .............................. 202021037238

(51) Int. Cl.
G06N 3/047 (2023.01)
G06N 3/08 (2023.01)
G06N 3/10 (2006.01)

(52) U.S. Cl.
CPC .............. G06N 3/047 (2023.01); G06N 3/08 (2013.01); G06N 3/10 (2013.01)

(58) Field of Classification Search
None
See application file for complete search history.

(56) References Cited

U.S. PATENT DOCUMENTS 11,164,077 B2 * 11/2021 Düll et al. ............... G06N 7/01
2014/0025613 A1 * 1/2014 Ponulak ................ G06N 3/049
706/25

(Continued)

FOREIGN PATENT DOCUMENTS

CN 110651279 A 1/2020

OTHER PUBLICATIONS

Ponomarev et al. "Using Reinforcement Learning in the Algorithmic Trading Problem", J. Commun. Technol. Electron., vol. 64, 1450-1457 (2019).*

(Continued)

*Primary Examiner* — Maikhanh Nguyen
(74) *Attorney, Agent, or Firm* — Finnegan, Henderson, Farabow, Garrett & Dunner, LLP

(57) ABSTRACT

This disclosure relates to method and system for optimal policy learning and recommendation for distribution task using deep RL model, in applications where when the action space has a probability simplex structure. The method includes training a RL agent by defining a policy network for learning the optimal policy using a policy gradient (PG) method, where the policy network comprising an artificial neural network (ANN) with a set of outputs. A continuous action space having a continuous probability simplex structure is defined. The learning of the optimal policy is updated based on one of stochastic and deterministic PG. For stochastic PG, a Dirichlet distribution based stochastic policy parameterized by output of the ANN with an activation function at an output layer of the ANN is selected. For deterministic PG, a soft-max function is selected as activation function at the output layer of the ANN to maintain the probability simplex structure.

11 Claims, 3 Drawing Sheets

(56) References Cited

U.S. PATENT DOCUMENTS

2017/0032245 A1* 2/2017 Osband ................. G06N 3/045
2017/0140269 A1* 5/2017 Schaul .................. G06N 3/006
2017/0323195 A1* 11/2017 Crawford .............. G06N 3/088
2020/0065672 A1* 2/2020 Osband ................. G06N 3/045

OTHER PUBLICATIONS

J Lin "On The Dirichlet Distribution", Queen's University Kingston, Ontario, Canada, Sep. 2016.*
Chou et al., "Improving Stochastic Policy Gradients in Continuous Control with Deep Reinforcement Learning using the Beta Distribution," Proceedings of (ICML) International Conference on Machine Learning (2017).
Ciosek et al., "Expected Policy Gradients for Reinforcement Learning," Journal of Machine Learning Research, 21:1-51 (2020).
Pal et al., "Multiplicative Schrödinger problem and the Dirichlet transport," Probability (2020).
Silver et al., "Deterministic Policy Gradient Algorithms," International Conference on Machine Learning (2014).
Subramanian et al., "Learn: A Reinforcement Learning Based Bidding Strategy for Generators in Single sided Energy Markets," $10^{th}$ ACM International Conference (2019).

* cited by examiner

OPTIMAL POLICY LEARNING AND RECOMMENDATION FOR DISTRIBUTION TASK USING DEEP REINFORCEMENT LEARNING MODEL

PRIORITY CLAIM

This U.S. patent application claims priority under 35 U.S.C. § 119 to: India Application No. 202021037238, filed on Aug. 28, 2020. The entire contents of the aforementioned application are incorporated herein by reference.

TECHNICAL FIELD

The disclosure herein generally relates to learning and recommendations, and, more particularly, to optimal policy learning and recommendation for a distribution task using a deep reinforcement learning (RL) model.

BACKGROUND

Reinforcement learning (RL) involves learning optimal policies under general sequential decision-making scenarios under uncertainty. Typically, learning happens by sequential interaction of a learning agent with a real system (or simulator) where the model information is unknown (model-free). The system model is a Markov decision process (MDP) where system evolves over 'states', and 'actions' are decisions that need to be optimally exercised by the 'agent' (or RL agent).

For continuous action spaces, policy gradient methods are known to perform better compared to purely action-value based methods like Q-learning. In the simplest setting, these action spaces could be complete Euclidean spaces like $R^k$. Policy gradient methods search in the space of stochastic policies in general. Hence, they use a parametrized conditional distribution on the action space given a state. For discrete action setting, the distribution is typically a multi-valued categorical random variable. For a simple continuous action setting encompassing the entire $R^k$, a gaussian conditional distribution can be erected.

There are applications where the action spaces may be restricted and structured. In such cases, using a gaussian distribution can be inappropriate as its support is unbounded.

SUMMARY

Embodiments of the present disclosure present technological improvements as solutions to one or more of the above-mentioned technical problems recognized by the inventors in conventional systems. For example, in one embodiment, a method for optimal policy learning and recommendation for a distribution task using a deep reinforcement learning (RL) model is provided. The method includes training, via one or more hardware processors, a reinforcement learning (RL) agent by modeling an interaction of the RL agent with an environment. Modeling the interaction is characterized by defining a policy network for learning an optimal policy for a distribution task using a policy gradient method, the policy network comprising an artificial neural network (ANN) with at least one output; defining a continuous action space comprising a continuous probability simplex structure; and updating the learning of the optimal policy based on one of a stochastic policy gradient and a deterministic policy gradient. Herein, for the stochastic policy gradient, the policy gradient method comprises selecting a Dirichlet distribution based stochastic policy parameterized by the at least one output of the ANN with a uniquely selected activation function at an output layer of the ANN. Also, herein, for the deterministic policy gradient, the probability simplex structure of the continuous action space is maintained by selecting a soft-max function as an activation function at the output layer of the ANN. The method further includes learning, based on the training, the optimal policy by the RL agent using one or more real-time inputs, via the one or more hardware processors.

In another aspect, a system for optimal policy learning and recommendation for a distribution task using a deep reinforcement learning (RL) model is provided. The system includes a memory storing instructions, one or more communication interfaces; and one or more hardware processors coupled to the memory via the one or more communication interfaces, wherein the one or more hardware processors are configured by the instructions to train a reinforcement learning (RL) agent by modeling an interaction of the RL agent with an environment. Modeling the interaction is characterized by defining a policy network for learning an optimal policy for a distribution task using a policy gradient method, the policy network comprising an artificial neural network (ANN) with at least one output; defining a continuous action space comprising a continuous probability simplex structure; and updating the learning of the optimal policy based on one of a stochastic policy gradient and a deterministic policy gradient. Herein, for the stochastic policy gradient, the policy gradient method comprises selecting a Dirichlet distribution based stochastic policy parameterized by the at least one outputs of the ANN with a uniquely selected activation function at an output layer of the ANN. Also, herein, for the deterministic policy gradient, the probability simplex structure of the continuous action space is maintained by selecting a soft-max function as an activation function at the output layer of the ANN. The one or more hardware processors are further configured by the instructions to learn, based on the training, the optimal policy by the RL agent using one or more real-time inputs, via the one or more hardware processors.

In yet another aspect, a non-transitory computer readable medium for a method for optimal policy learning and recommendation for a distribution task using a deep reinforcement learning (RL) model is provided. The method includes training, via one or more hardware processors, a reinforcement learning (RL) agent by modeling an interaction of the RL agent with an environment. Modeling the interaction is characterized by defining a policy network for learning an optimal policy for a distribution task using a policy gradient method, the policy network comprising an artificial neural network (ANN) with at least one output; defining a continuous action space comprising a continuous probability simplex structure; and updating the learning of the optimal policy based on one of a stochastic policy gradient and a deterministic policy gradient. Herein, for the stochastic policy gradient, the policy gradient method comprises selecting a Dirichlet distribution based stochastic policy parameterized by the at least one output of the ANN with a uniquely selected activation function at an output layer of the ANN. Also, herein, for the deterministic policy gradient, the probability simplex structure of the continuous action space is maintained by selecting a soft-max function as an activation function at the output layer of the ANN. The method further includes learning, based on the training, the optimal policy by the RL agent using one or more real-time inputs, via the one or more hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
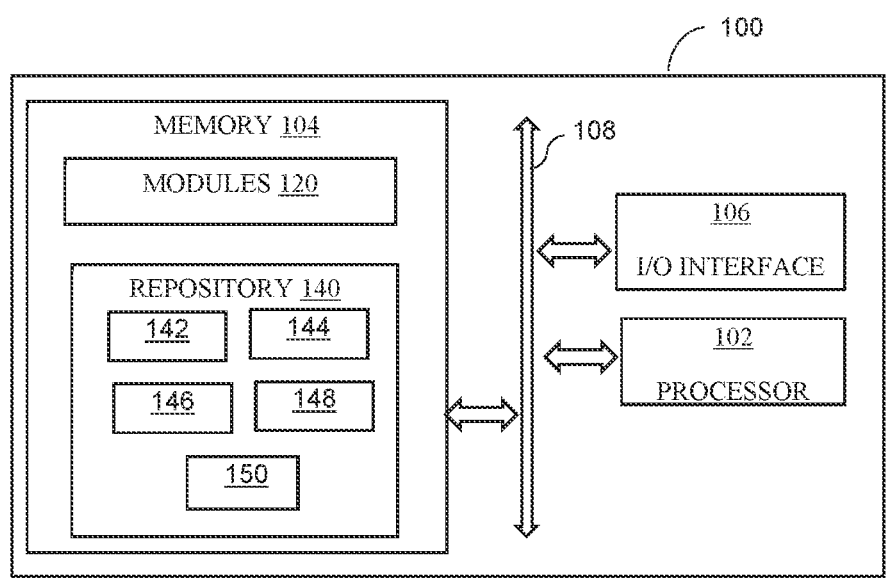
FIG. 1 illustrates a block diagram of a system for optimal policy learning and recommendation for a distribution task using a deep reinforcement learning (RL) model, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Certain problems or application areas utilize reinforcement learning (RL) for prediction. Typically, such problems have restricted and structured action spaces. Examples of such application areas may include, but are not limited to bidding for power, portfolio management, and so on. For instance, DQN based RL approaches have been considered to learn optimal-bidding strategies in one-sided energy markets. At each time step, the agent (OR the generator in question) places bids (performs an action) in a set of 'K' bands. Prior approaches considered the action space as a small finite set consisting of certain prefixed proles (or shapes) learnt from data. This finite set representation of the action space can be very restrictive in the search for the optimal-bidding strategy. An exact way of modelling the action space leads to a combinatorically explosive finite set of actions. The problem is to devise a sequential bidding strategy which tries and maximizes returns for a particular generator over a finite horizon.

This is a portfolio management problem which involves starting with some fixed principal amount which is invested in n risky assets (stocks) and a bond (risk free asset) to start on. It assumes no exogenous infusion OR withdrawal of money after the initial investment. The system evolves in time resulting in dip/rise in the stock prices resulting in fluctuation in the net principal amount. One has the option to rebalance this principal amount at regular intervals depending on the rebalancing frequency. The above sequential decision problem under the price fluctuation uncertainty can be cast as an MDP with state being the net principal amount at the end of a time epoch.

In aforementioned applications, the action spaces are continuous but restricted and structured. In such cases, using a gaussian distribution would be inappropriate as its support is unbounded. The structure (or restriction) exhibited by the continuous action spaces here is that the sum of action components add up to a constant (for example, 1).

Various embodiments disclosed herein provides method and system for optimal policy learning and recommendation for a distribution task using a deep RL model such that the specialized constraint (wherein the sum of action components add up to a constant) is satisfied. Policy gradient (PG) approaches may facilitate in handling continuous action spaces as opposed to value-function based methods. The stochastic policy gradient approach searches over the larger space of stochastic policies as opposed to action-value function-based methods which search over the space of deterministic policies. In an embodiment, the disclosed method and system utilizes a Dirichlet form of the policy since the support of a Dirichlet distribution exactly matches the probability simplex structure of the action space. The aforementioned and other embodiments are described in detail in following description.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Figure 2:
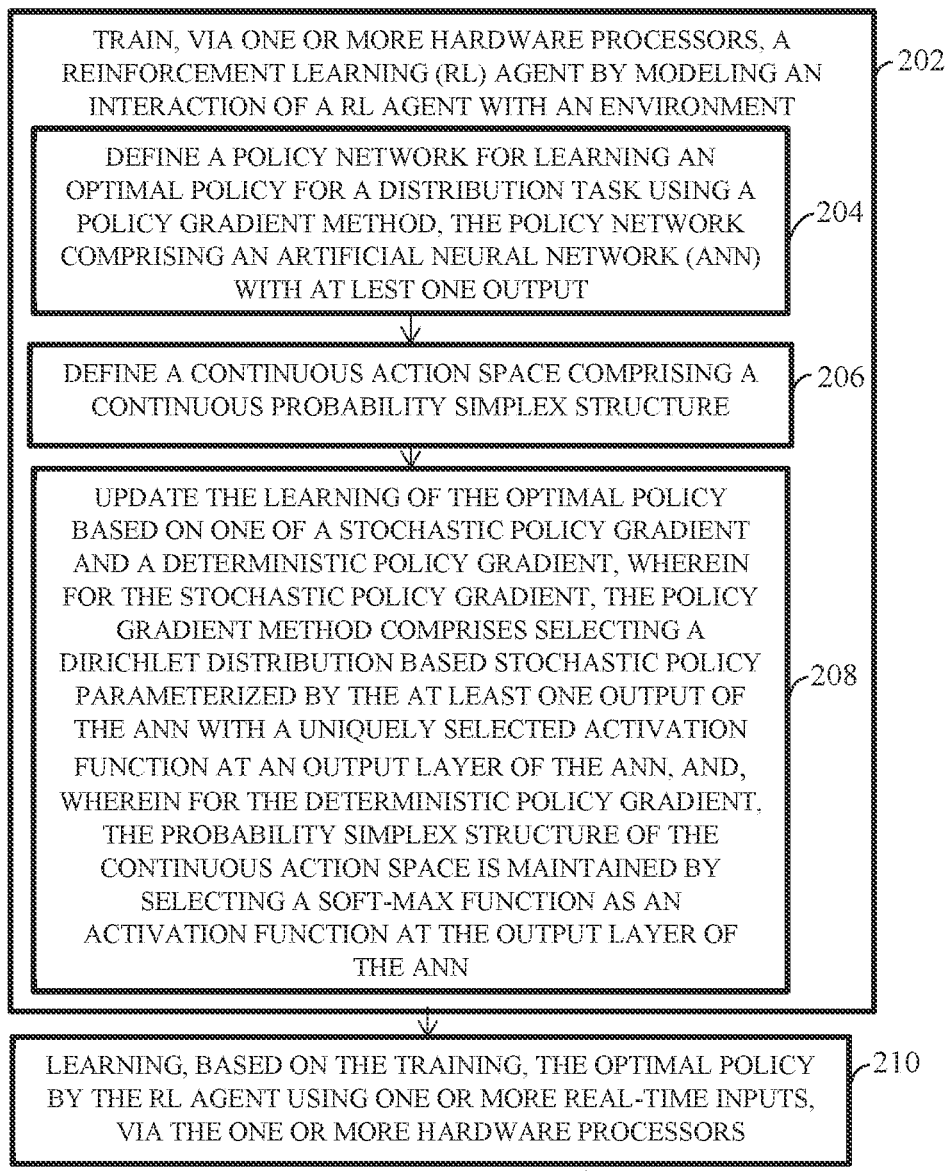
FIG. 2 illustrates a flow diagram of a method for optimal policy learning and recommendation for a distribution task using a deep RL model is described in accordance with an example embodiment.
Figure 3:
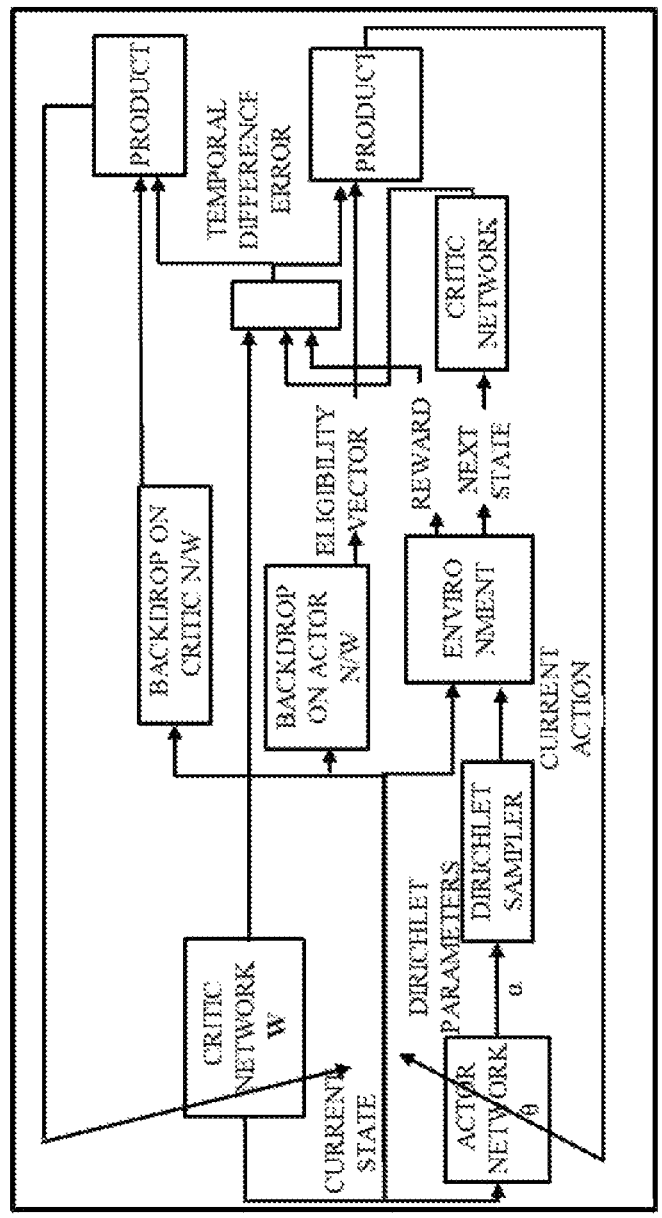
FIG. 3 is a block-diagram illustrating one step of a basic actor-critic approach for optimal policy learning and recommendation for a distribution task using a deep RL model, in accordance with an example embodiment.

Referring now to the drawings, and more particularly to FIGS. 1 through 3, where similar reference characters denote corresponding features consistently throughout the figures, there are shown preferred embodiments and these embodiments are described in the context of the following exemplary system and/or method.

FIG. 1 illustrates a block diagram of a system 100 for optimal policy learning and recommendation for a distribution task using a deep reinforcement learning (RL) model, according to some embodiments of the present disclosure. The disclosed system 100 is capable of predicting an optimal policy for a distribution task using a Deep RL model. Examples of the distribution task may include, but are not limited to, bidding, self-balancing portfolio management, and so on. In an embodiment, the use of deep RL model in such distribution tasks are characterized by the fact that the action spaces in such applications/problems are continuous and have a specialized structure of the components always adding up to a constant (q). The disclosed system utilizes a policy gradient RL method which exploits this specialized structure (i.e. a structure where components always adding up to a constant) in the action spaces. For example, in an embodiment, the components may add up to 1. The action spaces where the components may add up to 1 may be referred to as assuming a probability simplex structure.

The system 100 facilitates in training an RL agent by modeling the interaction of the RL agent with an environment. Further, the system 100 facilitates in learning, based on the training, the optimal policy by the RL agent using one or more real-time inputs.

The system 100 includes or is otherwise in communication with one or more hardware processors such as a processor 102, at least one memory such as a memory 104, and an I/O interface 106. The processor 102, memory 104, and the I/O interface 106 may be coupled by a system bus such as a system bus 108 or a similar mechanism. The I/O interface 106 may include a variety of software and hardware interfaces, for example, a web interface, a graphical user interface, and the like The interfaces 106 may include a variety of software and hardware interfaces, for example, interfaces for peripheral device(s), such as a keyboard, a mouse, an external memory, a camera device, and a printer. Further, the interfaces 106 may enable the system 200 to communicate with other devices, such as web servers and external databases. The interfaces 106 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 106 may include one or more ports for connecting a number of computing systems with one another or to another server computer. The I/O interface 106 may include one or more ports for connecting a number of devices to one another or to another server.

The hardware processor 102 may be implemented as one or more microprocessors, microcomputers, microcontrollers, digital signal processors, central processing units, state machines, logic circuitries, and/or any devices that manipulate signals based on operational instructions. Among other capabilities, the hardware processor 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 120 and a repository 140 for storing data processed, received, and generated by one or more of the modules 120. The modules 120 may include routines, programs, objects, components, data structures, and so on, which perform particular tasks or implement particular abstract data types.

The repository 140, amongst other things, includes a system database 142 and other data 144. The other data 144 may include data generated as a result of the execution of one or more modules in the other modules 130.

Referring to FIG. 2, a flow diagram of a method 200 for optimal policy learning and recommendation for a distribution task using a deep RL model is described in accordance with an example embodiment. The method 200 depicted in the flow chart may be executed by a system, for example, the system, 100 of FIG. 1. In an example embodiment, the system 100 may be embodied in a computing device.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 200 are described with help of system 100. However, the operations of the method 200 can be described and/or practiced by using any other system.

At 202, the method 200 includes training a RL agent by modeling an interaction of the RL agent with an environment. The RL agent interacts with its environment via its 'actions' at discrete time steps and receives a 'reward', thereby transitioning the agent to a new 'state'. During the interaction with the environment, a decision process defines the probability of transitioning into a new state, getting reward given the current state and the execution of an action. The dynamics of the environment are outside the control of the RL agent, and hence achieving a new state at any time instant may be given by the dynamics of environment (and not by agent's actions). However, the agent may follow a 'policy' to estimate the net state. A 'Policy' is defined as a probability distribution of 'actions' given a 'state'. When the RL agent follows the policy, it generates the sequence of states, actions and rewards, known as trajectory.

The objective of the RL agent is to maximize 'expected' rewards when following the policy. A set of parameters (including weights and biases of the neural network) are defined to parameterize the policy. The method 202 models an interaction of the RL agent with the environment to define an optimal policy which can give maximum rewards. The modeling of the interaction is characterized by characterized by following steps 204-206 as described below.

At 204, the method 202 includes defining a policy network for learning an optimal policy for a distribution task using a policy gradient method. The examples of the distribution task, my include, but are not limited to, applications like bidding, self-balancing portfolio management and so on. The policy network includes an artificial neural network (ANN) with a set of outputs. At 206, the method 202 includes defining a continuous action space comprising a continuous probability simplex structure. At 208, the method 202 includes updating the learning of the optimal policy based on one of a stochastic policy gradient and a deterministic policy gradient. Herein, for the stochastic policy gradient, the policy gradient method includes selecting a Dirichlet distribution based stochastic policy parameterized by the output of the ANN with a uniquely selected a unique activation function at an output layer of the ANN. For the deterministic policy gradient, the probability simplex structure of the continuous action space is maintained by selecting a soft-max function as an activation function at the output layer of the ANN. The learning of the optimal policy based on one of a stochastic policy gradient and a deterministic policy gradient is described further in detail in the description below.

According to the present subject matter, for the stochastic policy gradient, the disclosed method utilizes a Dirichlet form of the policy as the support of a Dirichlet distribution exactly matches the probability simplex structure of the action space. To execute a policy-gradient under a Dirichlet policy, a gradient of the parameterized value function is computed. As per the policy gradient theorem, the policy gradient is proportional to the following expectation.

$$J(\theta) \propto \varepsilon_\pi [G_t \nabla_\theta \log(\pi(A_t|S_t, \theta))] \qquad (1)$$

While learning, a sample of the above product random variable is used to approximate the above expectation. The learning update of the policy parameter vector θ is updated based on a stochastic gradient descent update as follows.

$$\theta_{t+1} = \theta_t + \alpha G_t \nabla_\theta \log(\pi(A_t|S_t,\theta)) \quad (2)$$

The above update is also referred to as a Monte-Carlo policy gradient update. In equation (2), α refers to the step-size. $G_t$ refers to the return which is the sum of rewards from time t till the end of the episode. This means this update needs the episode to be simulated completely before updating. The above learning scheme may be further improved by introducing a baseline and using a bootstrapped estimate of the returns. The baseline addition marginally speeds up learning without introducing any bias. The bootstrapping reduces the variance of the gradient estimate at the expense of introducing some bias. The bootstrapped scheme is referred to as an actor-critic framework which is substantially faster compared to a Monte-Carlo policy gradient approach.

A block-diagram illustrating one step of a basic actor-critic approach with reference to FIG. 3. The actor-critic approach maintains an additional critic network which gives an estimate of the value function at the current state for each iteration. It involves computing the 1-step temporal difference at each iteration which is further used to update the weights of both the actor and critic networks as follows. In FIG. 1 illustrates one step of the actor-critic approach pictorially where each step involves the following updates.

$$\delta_t = r(S_t, A_t, S_{t+1}) + \hat{V}(S_{t+1}, w_t) - \hat{V}(S_t, w_t) \quad (3)$$

$$w_{t+1} = w_t + \alpha \delta_t \nabla \hat{V}(S_t, w_t) \quad (4)$$

$$\theta_{t+1} = \theta_t + \alpha_\theta \delta_t \nabla_\theta \log(\pi(A_t|S_t,\theta)) \quad (5)$$

Referring back to FIG. 2, as previously described at 206, in one embodiment, the optimal policy is defined and learnt based on based on the stochastic policy gradient using Dirichlet distribution based policy network. In the present (first) embodiment, K separate feedforward ANNs are selected. The combined set of parameters for the K separate feedforward ANNs are denoted as:

$$\theta = [\theta_1, \theta_2, \theta_3 \ldots \theta_K],$$

Where $\theta_i$ is parameter vector of the $i^{th}$ ANN, where i=1, 2, ... K.

The $i^{th}$ ANN output (corresponding to the $i^{th}$ Dirichlet parameter) is denoted as $\alpha_i(s;\theta_i)$. The Dirichlet parameters are all non-negative. In the present embodiment, selecting the Dirichlet distribution based stochastic policy includes selecting a general Dirichlet distribution policy network with a uniquely selected novel activation function at the output layer of the ANN. Herein, since the Dirichlet parameters are all positive, hence a compatible activation function is to be selected at the output layer as described below.

Herein, since the output is always positive, an exponential activation may be considered as a valid choice. However, the growth rate to 1 or its decay rate to zero can be very high. Further, the derivative also goes unbounded as input tends to 1. Having bounded derivatives is crucial for the overall policy gradient computation to be stable. The Relu activation function tackles this challenge by maintaining a constant slope of 1 for any input >0. Since Relu takes value 0 for any input <0, Relu may not be an admissible choice of activation function as the parameters of the dirichlet should be strictly positive. Hence, in the present embodiment, an activation function between the exponential activation and the Relu activation is selected with the following choice of activation functions:

for x<0, i.e. A(x)=1/(1−x), which is an inverse decay instead of an exponential decay, for x>0, A(x)=x+1, which is a linear growth like a Relu activation resulting in a constant derivative.

The aforementioned activation function is referred to as linear inverse-linear (or, LinInvLin) operator.

The Dirichlet policy can now be expressed as:

$$\pi(a|s,\theta) = \frac{\Gamma\left(\sum_{i=1}^k \alpha_i(s;\theta_i)\right)}{\prod_{i=1}^k \Gamma(\alpha_i(s;\theta_i))} \prod_{i=1}^k a_i^{\alpha_i(s;\theta_i)-1} \quad (6)$$

Taking log on both sides, $$\log \pi(a|s,\theta) = \log \Gamma(\Sigma_{i=1}^k \alpha_i(s;\theta_i)) - \Sigma_{i=1}^k \log \Gamma(\alpha_i(s;\theta_i)) + \Sigma_{i=1}^k (\alpha_i(s;\theta_i)-1)\log a_i \quad (7)$$

The eligibility vector finally turns out to be:

$$\nabla_{\theta_j} \pi(a|s,\theta) = \frac{\Gamma'\left(\sum_{i=1}^k \alpha_i(s;\theta_i)\right)}{\Gamma\left(\sum_{i=1}^k \alpha_i(s;\theta_i)\right)} \nabla_{\theta_j} \alpha_j(s;\theta_j) - \frac{\Gamma'(\alpha_j(s;\theta_j))}{\Gamma(\alpha_j(s;\theta_j))} \nabla_{\theta_j} \alpha_j(s;\theta_j) + \log a_i \nabla_{\theta_j} \alpha_j(s;\theta_j) \quad (8)$$

For a non-linear architecture, the above gradients can be obtained efficiently using backpropagation while for a linear architecture the gradients can be computed as follows.

$\alpha_j(s;\theta_j) = \exp(\varphi(s)^T \theta_j)(\because \alpha_j \geq 0)$ in which case:

$\nabla_{\theta_j} \alpha_j(s;\theta_j) = \exp(\varphi(s)^T \theta_j)\varphi(s)$ in the above equation.

In another (second) embodiment, the optimal policy is defined and learnt based on the stochastic policy gradient using Dirichlet distribution based policy network wherein the uniquely selected novel activation function at the output layer of the ANN includes a linear inverse-linear (or, LinInvLin) operator activation, as described previously. In the present embodiment, the form of Dirichlet includes only one parameter. In the present embodiment, a single ANN from amongst the K separate feedforward ANNs is selected. The associated policy network structure is a single ANN with one output. This makes learning easy as the no. of parameters to be estimated are very few while the policy parameterization is significantly constrained. The stochastic policy parameterization for a symmetric Dirichlet is as follows.

$$\pi(a|s,\theta) = \frac{\Gamma(\alpha(s;\theta)k)}{\Gamma(\alpha(s;\theta))^k} \prod_{i=1}^k a_i^{\alpha_i(s;\theta_i)-1} \quad (9)$$

Here $\alpha_i(s;\theta_i)$ is the output of an ANN with linear inverse-linear (or, LinInvLin) output layer. For a linear function approximator, $\alpha_i(s;\theta_j) = \exp(\varphi(s)^T \theta_j)$ $(\because \alpha_j \geq 0)$ as in the previous embodiment. Taking log on both sides of the above equation:

$$\log \pi(a|s,\theta) = \log \Gamma(\alpha(s)k) - k \log \Gamma(\alpha(s)) + \sum_{i=1}^k (\alpha(s)-1)\log a_i \quad (10)$$

-continued $$\nabla_{\theta_j} \log(\pi(a \mid s, \theta)) = \quad (11)$$

$$\frac{\Gamma'(\alpha(s)k)}{\Gamma(\alpha(s)k)} k \nabla_\theta \alpha(s; \theta) - k \frac{\Gamma'(\alpha(s))}{\Gamma(\alpha(s))} \nabla_\theta \alpha(s; \theta) + \sum_{i=1}^{k} \nabla_\theta \alpha(s; \theta) \log a_i$$

For linear function approximation, $\nabla_\theta \alpha(s;\theta)$ is replaced by $\exp(\varphi(s)^T \theta)\varphi(s)$ while for non-linear ANNs, backpropagation is used to compute $\nabla_\theta \alpha(s;\theta)$. The class of distributions captured by a symmetric Dirichlet is easy to interpret. If a=1, the symmetric Dirichlet is a uniform distribution, while for a>1, the distribution is concentrated at the center of simplex i.e. sampled points tend to have similar values. For a<1, the samples are such that all but one are close to zero.

In yet another (third) embodiment, the optimal policy is defined and learnt based on the stochastic policy gradient using Dirichlet distribution based policy network in a such a manner that a balance between the first embodiment (having the large number of learnable parameters (general policy gradient)) and the second embodiment (limited flexibility of the symmetric Dirichlet) is achieved. In the present embodiment, a single feedforward ANN with K outputs is considered. In the present embodiment, the network may be deep and have multiple hidden layers. In this case, the parameters may be denoted as:

$$\theta = [\theta_c, \theta_1, \theta_2, \theta_3 \ldots \theta_K],$$

where $\theta_c$ denotes the weights up to the last layer. The weights of the last layer can be partitioned into K sets $[\theta_1, \theta_2, \theta_3 \ldots \theta_K]$ The $i^{th}$ Dirichlet parameter is denoted as $\alpha_i(s; \theta_c, \theta_i)$, which is the $i^{th}$ output of the K-output ANN. The log of the policy parametrization in the present embodiment is:

$$\log(\pi(a|s,\theta)) = \log \Gamma \Sigma_{i=1}^{k} \alpha_i(s; \theta_c, \theta_i)) - \Sigma_{i=1}^{k} \log \Gamma(\alpha_i(s; \theta_c, \theta_i)) + \Sigma_{i=1}^{k} (\alpha_i(s; \theta_c, \theta_i) - 1) \log a_i \quad (12)$$

The eligibility vector can be partitioned in a similar manner as was partitioned and described with reference to first and second embodiments. Specifically, the partial derivative w.r.t to the common parameters $\theta c$ is:

$$\nabla_{\theta_j} \log\left(\pi(a \mid s, \theta)\right) = \frac{\Gamma'\left(\sum_{i=1}^{k} \alpha_i(s; \theta_c, \theta_i)\right)}{\Gamma\left(\sum_{i=1}^{k} \alpha_i(s; \theta_c, \theta_i)\right)} \sum_{i=1}^{k} \theta_c \alpha_i(s; \theta_c, \theta_i) -$$

$$\sum_{i=1}^{k} \frac{\Gamma'(\alpha_i(s; \theta_c, \theta_i)) - \alpha(s))}{\Gamma(\alpha_i(s; \theta_c, \theta_i)) -} \nabla_\theta \alpha_i(s; \theta_c, \theta_i) + \sum_{i=1}^{k} \log a_i \nabla_{\theta_c} \alpha_i(s; \theta_c, \theta_i)$$

The partial derivative associated with $\theta_j$ (for j=1, 2 … K) is as follows:

$$\nabla_{\theta_j} \log(\pi(a \mid s, \theta)) = \frac{\Gamma'\left(\sum_{i=1}^{k} \alpha_i(s; \theta_c, \theta_i)\right)}{\Gamma\left(\sum_{i=1}^{k} \alpha_i(s; \theta_c, \theta_i)\right)} \nabla_{\theta_j} \alpha_j(s; \theta_c, \theta_j) -$$

$$\frac{\Gamma'(\alpha_j(s; \theta_c, \theta_j))}{\Gamma(\alpha_j(s; \theta_c, \theta_j))} \nabla_{\theta_j} \alpha_j(s; \theta_c, \theta_j) + \log a_j \nabla_{\theta_j} \alpha_j(s; \theta_c, \theta_j)$$

The gradients of the $i^{th}$ ANN output w.r.t the common parameters $\theta_c$ is $\nabla_{\theta_c} \alpha_i(s; \theta_c, \theta_i)$ On the other hand, the gradients of the $j^{th}$ output w.r.t the weights connecting the $j^{th}$ output node in the last layer ($\theta_j$) is $\nabla_{\theta_j} \alpha_i(s; \theta_c, \theta_i)$. Both these can be computed efficiently via backpropagation.

The state formulation is typically incomplete which makes the model partially observable. In such scenarios, searching in the space of stochastic policies (as optimal policy may not be deterministic) may be necessary. In the embodiments disclosed herein, the action space is tightly modelled in a non-trivial fashion.

In the present embodiment like previous embodiments, the action function may be 'LinInvLin' activation.

It will however be understood that the in addition to the 'LinInvLin' activation, a soft plus activation (standard activation function) may be selected at the output layer of the policy network for the Dirichlet stochastic policy gradient method (in the first, second and the third embodiments mentioned above).

In still another (fourth) embodiment, a deterministic policy gradient approach may be specialized to probability simplex action spaces. As per the deterministic policy gradient theorem, $$J(\theta) \propto \varepsilon_\mu[\nabla_\theta \mu_\theta(s) \nabla_\alpha Q^\mu(s,\alpha)|_{\alpha=\mu_\theta(s)}] \quad (13)$$

where $\mu_o : S \to A$ is a family of maps parametrized by $\theta$.

In the present embodiment, an ANN function approximator is employed. The range of $\mu_o$ is the action space, which in the present embodiment is the probability simplex. To ensure this constraint, a soft-max function is selected at the output layer of the ANN. Since outputs of a soft-max add up to 1, this ensures the output of the ANN always lies in the simplex.

In order to learn the optimal policy, the present embodiment utilizes an actor-critic version of DPG with a soft-max output-layered ANN for policy parametrization. An actor-critic iteration is essentially some form of a generalized policy iteration involving the following three updates.

$$\delta_t = r(S_t, A_t, S_{t+1}) + \gamma Q^w(s_{t+1}, \alpha_{t+1}) - Q^w(s_t, w_t) \quad (14)$$

$$w_{t+1} = w_t + \alpha_w \delta_t \nabla_w Q^w(s_t, \alpha_t) \quad (15)$$

$$\theta_{t+1} = \theta_t + \alpha_\theta \nabla_\theta \mu_\theta(s_t) \nabla_\alpha Q^w(s_t, \alpha_t)|_{\alpha=\mu_\theta(s)} \quad (16)$$

At 310, the method 300 includes learning, based on the training, the optimal policy by the RL agent using one or more real-time inputs.

Example Scenario

The DQN based RL approaches have been considered to learn optimal-bidding strategies (distribution task) in one-sided energy markets in the past. At each time step, the agent (OR the generator in question) places bids (performs an action) in a set of 'K' bands. Prior approaches considered the action space as a small finite set consisting of certain prefixed profiles (or shapes) learnt from data. This finite set representation of the action space can be very restrictive in the search for the optimal-bidding strategy. An exact way of modelling the action space leads to a combinatorially explosive finite set of actions. In various embodiments disclosed herein, this issue is circumvented by making a continuous approximation to this finite (explosive set of actions. This recast of the action space now facilitates in applying the disclosed embodiments on this problem.

In an example scenario, for instance, all generators (or players) in the Australian energy market are supposed to place their bids in 10 buckets, where each bucket(band) i is associated with a per-unit price $P_i$. The per-unit price $P_i$ at each band is typically fixed for each generator while the generators mainly play around with the bid quantity placed at each of these 10 bands. Herein, the price Pi even though fixed for each generator can be different from generator to generator. This means the bid prediction problem can be simplified to estimating only the 10 bid quantities placed at each price band. Further, there is a significant set of generators where the total bid quantity (denoted compactly as TBQ) is a constant across the whole data set. This could mean these plants operate at their capacity almost always. For all such generators, the 10 targets which needs to predicted, all add up to a constant. It was assumed that the RL agent (generator) for whom, an optimal-bidding strategy is devised, belongs to this class, for ease of exposition.

The problem is to devise a sequential bidding strategy which tries and maximizes returns for a particular generator over a finite horizon. The optimal bidding problem has been posed earlier as an optimal control problem under an appropriate Makov decision process model. Herein, the action space formulation is refined and an intelligent RL scheme is proposed which exploits the structure of the generic action space. The state space here is typically continuous OR very large which rules out the possibility of solving the MDP using standard optimal control techniques like value iteration and policy iteration. RL offers us techniques to solve the problem under such circumstances provided one has an accurate simulator which mimics the environment.

The problem is to decide at each time-step, the optimal manner in which the generated power can be distributed among the ten price bands. The generated power is typically an integer and there is a combinatorially explosive number of ways in which this power can be distributed among the 10 bands. This leads to a huge action space which is hard to tackle both via value-based methods OR policy gradient (PG) approaches. Essentially in both approaches, the huge set of finite actions leads to a proportionately huge set of parameters in the associated non-linear approximation architectures, which makes learning infeasible. Various embodiments propose a work-around by modeling the total power distribution in a continuous fashion. This results in action space becoming continuous while having an interesting structure to it. Specifically it leads to a probability simplex (with components adding to 1).

Action value methods have issues tackling continuous action spaces. Maximizing the Q-function w.r.t the action needs to be carried out at each step which can be computationally expensive and can also run into local minima problems on account of non-convex nature of the function approximation.

In another example scenario, a portfolio management problem is illustrated as the distribution task, which involves starting with some fixed principal amount which is invested in n risky assets (stocks) and a bond (risk free asset) to start off. It assumes no exogenous infusion OR withdrawal of money after the initial investment. The system evolves in time resulting in dip/rise in the stock prices resulting in fluctuation in the net principal amount. One has the option to rebalance this principal amount at regular intervals depending on the rebalancing frequency.

The above sequential decision problem under the price fluctuation uncertainty can be cast as an MDP with state being the net principal amount at the end of a time epoch. The control action is the rebalancing of this principal amount before the system evolves further. The redistributing decision making can be exactly cast as a continuous action space of dimension n+1 with components constrained to add to 1. The reward is the difference between the net asset value between two successive epochs. Such an incremental reward would lead to the value function being the net cumulative profit over a finite horizon. One needs to now learn an optimal policy which enables us to optimally decide the rebalancing as a function of the current state (the current net principal amount). This is another concrete application where such action spaces naturally arise.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provides method and system for optimal policy learning and recommendation for distribution task using deep RL model, in various applications where continuous action spaces with a specialized constraint or structure, where the sum of action components add up to 1. These type of specialized action spaces arise in multiple applications like bidding, self-balancing portfolio management and so on. Policy gradient methods search directly in the space of policies. Policy search could be over (a) space of parametrized stochastic policies (b) space of parametrized deterministic policies. In an embodiment, the policy gradient approaches based on both stochastic and deterministic policy searches for probability simplex action spaces. The embodiments of present disclosure herein addresses unresolved problem of prescribing the right distributional form and the approximation architecture for both stochastic and deterministic policy gradients when the action space has a probability simplex structure.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory.

Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
training, via one or more hardware processors, a reinforcement learning (RL) agent by modeling an interaction of the RL agent with an environment, wherein modeling the interaction is characterized by:
defining a policy network for learning an optimal policy for a distribution task using a policy gradient method, the policy network comprising an artificial neural network (ANN) with a at least one output;
defining a continuous action space comprising a continuous probability simplex structure; and
updating the learning of the optimal policy based on one of a stochastic policy gradient and a deterministic policy gradient,
wherein for the stochastic policy gradient, the policy gradient method comprises selecting a Dirichlet distribution based stochastic policy parameterized by the at least one output of the ANN with a uniquely selected activation function at an output layer of the ANN, and
wherein for the deterministic policy gradient, the probability simplex structure of the continuous action space is maintained by selecting a soft-max function as an activation function at the output layer of the ANN; and
learning, based on the training, the optimal policy by the RL agent using one or more real-time inputs, via the one or more hardware processors;
wherein selecting the Dirichlet distribution based stochastic policy comprises selecting a general Dirichlet distribution policy network, and wherein the uniquely selected activation function at the output layer of the ANN comprises a linear inverse-linear (LinInvLin) activation function, the LinInvLin defined as:
for $x<0$, i.e. $A(x)=1/(1-x)$, which is an inverse decay,
for $x>0$, $A(x)=x+1$, which is a linear growth like a Relu activation resulting in a constant derivative.

2. The method of claim 1, wherein selecting the Dirichlet distribution based stochastic policy comprises selecting a Symmetric Dirichlet, and wherein the uniquely selected activation function at the output layer of the ANN comprises a linear inverse-linear (LinInvLin) activation function, the LinInvLin defined as:
for $x<0$, i.e. $A(x)=1/(1-x)$, which is an inverse decay,
for $x>0$, $A(x)=x+1$, which is a linear growth like a Relu activation resulting in a constant derivative.

3. The processor implemented method of claim 1, further comprising recommending an action based on the optimal policy, wherein recommending the action comprises:
observing a state while performing the distribution task at a time slot associated with a time step;
determining, based on the optimal policy, the action from among a plurality of actions defined in the action space, the action matching the state; and recommending the action to a user.

4. The processor implemented method of claim 1, wherein the distribution task comprises allocating a generated power in integer units by a generator to a set of targets at a plurality of time-steps for bidding, and wherein action comprises placing bids obtained from a combinatorially explosive finite set, the combinatorially explosive finite set approximated by the continuous probability simplex space, the RL agent comprises the generator, and a state comprising one of a demand and market clearing price (MCP) at the end of each time-step, and reward comprises one of a revenue and profit obtained at each time-step.

5. The processor implemented method of claim 1, wherein the distribution task comprises portfolio management under price fluctuation uncertainty, wherein action comprises involving a fixed principal amount to be invested in one or more risky assets and one or more risk free asset, and wherein state comprises a state of net principal amount at the end of a time epoch, and wherein a control action at each time step is a rebalancing of principal amount before the system evolves further, and wherein reward comprises a difference between the net asset value between two successive epoch.

6. A system, comprising:
a memory storing instructions;
one or more communication interfaces; and
one or more hardware processors coupled to the memory via the one or more communication interfaces, wherein the one or more hardware processors are configured by the instructions to:
train a reinforcement learning (RL) agent by modeling an interaction of the RL agent with an environment, wherein to model the interaction, the one or more hardware processors are configured by the instructions to:
define a policy network for learning an optimal policy for a distribution task using a policy gradient method, the policy network comprising an artificial neural network (ANN) with at least one output;
define a continuous action space comprising a continuous probability simplex structure; and
update the learning of the optimal policy based on one of a stochastic policy gradient and a deterministic policy gradient,
wherein for the stochastic policy gradient, the policy gradient method comprises selecting a Dirichlet distribution based stochastic policy parameterized by the at least one output of the ANN with a uniquely selected activation function at an output layer of the ANN, and
wherein for the deterministic policy gradient, the probability simplex structure of the continuous action space is maintained by selecting a soft-max function as an activation function at the output layer of the ANN; and
learn, based on the training, the optimal policy by the RL agent using one or more real-time inputs;
wherein the one or more hardware processors are configured by the instructions to select the Dirichlet distribution based stochastic policy by selecting a general Dirichlet distribution policy network, and wherein the uniquely selected activation function at the output layer of the ANN comprises a linear inverse-linear (or, LinInvLin) activation function, the LinInvLin defined as:
for $x<0$, i.e. $A(x)=1/(1-x)$, which is an inverse decay,
for $x>0$, $A(x)=x+1$, which is a linear growth like a Relu activation resulting in a constant derivative.

7. The system of claim 6, wherein the one or more hardware processors are configured by the instructions to select the Dirichlet distribution based stochastic policy by selecting a Symmetric Dirichlet, and wherein the uniquely selected activation function at the output layer of the ANN comprises a linear inverse-linear (or, LinInvLin) activation function, the LinInvLin defined as:
for $x<0$, i.e. $A(x)=1/(1-x)$, which is an inverse decay, for x>0, A(x)=x+1, which is a linear growth like a Relu activation resulting in a constant derivative.

8. The system of claim 6, wherein the one or more hardware processors are configured by the instructions to recommend an action based on the optimal policy, wherein to recommend the action, the one or more hardware processors are configured by the instructions to:
observe a state while performing the distribution task at a time slot associated with a time step;
determine, based on the optimal policy, the action from among a plurality of actions defined in the action space, the action matching the state; and
recommend the action to a user.

9. The system of claim 6, wherein the distribution task comprises allocating a generated power in integer units by a generator to a set of targets at a plurality of time-steps for bidding, and wherein action comprises placing bids obtained from a combinatorially explosive finite set, the combinatorially explosive finite set approximated by the continuous probability simplex space, the RL agent comprises the generator, and a state comprising one of a demand and market clearing price (MCP) at the end of each time-step, and reward comprises one of a revenue and profit obtained at each time-step.

10. The system of claim 6, wherein the distribution task comprises portfolio management under price fluctuation uncertainty, wherein action comprises involving a fixed principal amount to be invested in one or more risky assets and one or more risk free asset, and wherein state comprises a state of net principal amount at the end of a time epoch, and wherein a control action at each time step is a rebalancing of principal amount before the system evolves further, and wherein reward comprises a difference between the net asset value between two successive epoch.

11. One or more non-transitory machine readable information storage mediums comprising one or more instructions which when executed by one or more hardware processors cause:
training, via one or more hardware processors, a reinforcement learning (RL) agent by modeling an interaction of the RL agent with an environment, wherein modeling the interaction is characterized by:
defining a policy network for learning an optimal policy for a distribution task using a policy gradient method, the policy network comprising an artificial neural network (ANN) with a at least one output;
defining a continuous action space comprising a continuous probability simplex structure; and
updating the learning of the optimal policy based on one of a stochastic policy gradient and a deterministic policy gradient,
wherein for the stochastic policy gradient, the policy gradient method comprises selecting a Dirichlet distribution based stochastic policy parameterized by the at least one output of the ANN with a uniquely selected activation function at an output layer of the ANN, and
wherein for the deterministic policy gradient, the probability simplex structure of the continuous action space is maintained by selecting a soft-max function as an activation function at the output layer of the ANN; and
learning, based on the training, the optimal policy by the RL agent using one or more real-time inputs, via the one or more hardware processors;
wherein selecting the Dirichlet distribution based stochastic policy comprises selecting a general Dirichlet distribution policy network, and wherein the uniquely selected activation function at the output layer of the ANN comprises a linear inverse-linear (LinInvLin) activation function, the LinInvLin defined as:
for x<0, i.e. A(x)=1/(1−x), which is an inverse decay,
for x>0, A(x)=x+1, which is a linear growth like a Relu activation resulting in a constant derivative.

* * * * *